US008484626B2

(12) United States Patent
Nagulu et al.

(10) Patent No.: US 8,484,626 B2
(45) Date of Patent: Jul. 9, 2013

(54) GENERIC XML SCREEN SCRAPING

(75) Inventors: Sreeramamurthy Nagulu, Wesley Chapel, FL (US); Sijo Kuriakose, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1319 days.

(21) Appl. No.: 11/864,647

(22) Filed: Sep. 28, 2007

(65) Prior Publication Data
US 2009/0089742 A1    Apr. 2, 2009

(51) Int. Cl.
*G06F 9/45* (2006.01)
*G06F 9/455* (2006.01)

(52) U.S. Cl.
USPC ............. 717/136; 703/23; 703/24; 703/25; 703/26; 703/27; 703/28

(58) Field of Classification Search
None
See application file for complete search history.

(56) References Cited

U.S. PATENT DOCUMENTS

| | | | | |
|---|---|---|---|---|
| 4,604,686 A * | 8/1986 | Reiter et al. | ................ | 703/25 |
| 4,939,507 A * | 7/1990 | Beard et al. | ................ | 703/26 |
| 5,228,137 A * | 7/1993 | Kleinerman et al. | ........ | 703/26 |
| 5,261,079 A * | 11/1993 | Celi, Jr. | ................... | 703/24 |
| 5,329,471 A * | 7/1994 | Swoboda et al. | ............ | 703/23 |
| 5,414,762 A * | 5/1995 | Flisik et al. | ................. | 379/198 |
| 5,437,024 A * | 7/1995 | French | .................... | 1/1 |
| 5,440,697 A * | 8/1995 | Boegel et al. | ................ | 703/25 |
| 5,630,164 A * | 5/1997 | Williams et al. | ............. | 703/24 |
| 5,857,194 A * | 1/1999 | Kelliher et al. | ............... | 1/1 |
| 5,890,014 A * | 3/1999 | Long | ............................ | 703/25 |
| 5,912,669 A * | 6/1999 | Hsia | ........................... | 715/854 |
| 5,914,713 A * | 6/1999 | Nario et al. | .................. | 715/744 |
| 6,064,382 A * | 5/2000 | Diedrich et al. | .............. | 703/24 |
| 6,064,810 A * | 5/2000 | Raad et al. | ................... | 703/23 |
| 6,157,940 A * | 12/2000 | Marullo et al. | ............... | 703/27 |
| 6,209,124 B1 * | 3/2001 | Vermeire et al. | ............. | 717/114 |
| 6,308,146 B1 * | 10/2001 | La Cascia et al. | ............ | 703/24 |
| 6,342,905 B1 * | 1/2002 | Diedrich et al. | .............. | 703/24 |
| 6,374,207 B1 * | 4/2002 | Li et al. | ......................... | 703/27 |
| 6,427,000 B1 * | 7/2002 | Mumford et al. | ............. | 703/26 |
| 6,446,110 B1 * | 9/2002 | Lection et al. | ............... | 709/203 |
| 6,584,436 B2 * | 6/2003 | Hellestrand et al. | .......... | 703/28 |
| 6,622,176 B2 * | 9/2003 | Jones et al. | .................. | 719/328 |
| 6,732,067 B1 * | 5/2004 | Powderly | ...................... | 703/24 |
| 6,981,257 B2 * | 12/2005 | Teubner | ....................... | 718/101 |
| 7,047,526 B1 * | 5/2006 | Wheeler et al. | .............. | 717/136 |
| 7,054,924 B1 * | 5/2006 | Harvey et al. | ................ | 709/220 |
| 7,212,961 B2 * | 5/2007 | Settles | ........................... | 703/23 |
| 7,373,373 B2 * | 5/2008 | McElhannon | .............. | 709/201 |

(Continued)

OTHER PUBLICATIONS

Santiago Comella-Dorda, et al., "A Survey of Legacy System Modernization Approaches", Apr. 2000, Carnegine Mellon Software Engineering Institute, [retrieved on Jul. 19, 2011]. Retrieved from Internet <URL:http://www.dodreports.com/pdf/ada377453.pdf>; pp. 1-20.*

(Continued)

*Primary Examiner* — Thuy Dao
*Assistant Examiner* — Xi D Chen

(57) ABSTRACT

A method may include creating an Extensible Markup Language (XML) instruction file based on screen shots of a host system, providing the XML instruction file to a screen scraper program, executing screen scraping operations based on the XML instruction file, and outputting a user interface file based on the screen scraping operations that corresponds to extracted data output from the host system.

24 Claims, 7 Drawing Sheets

U.S. PATENT DOCUMENTS

| | | | | |
|---|---|---|---|---|
| 7,461,385 B2* | 12/2008 | Winter | | 703/27 |
| 7,490,031 B1* | 2/2009 | Qiu | | 703/26 |
| 7,539,982 B2* | 5/2009 | Stuart | | 717/140 |
| 7,613,599 B2* | 11/2009 | Bade et al. | | 717/136 |
| 7,644,400 B2* | 1/2010 | Harris et al. | | 717/136 |
| 7,647,370 B1* | 1/2010 | Liu et al. | | 709/203 |
| 7,844,764 B2* | 11/2010 | Williams | | 703/28 |
| 7,882,497 B2* | 2/2011 | Nanivadekar et al. | | 703/27 |
| 7,991,606 B1* | 8/2011 | D'Souza et al. | | 703/28 |
| 8,014,995 B2* | 9/2011 | Marsyla et al. | | 703/23 |
| 8,078,448 B1* | 12/2011 | Wohlberg et al. | | 703/23 |
| 8,095,919 B2* | 1/2012 | Harris et al. | | 717/136 |
| 2003/0048296 A1* | 3/2003 | Cullen et al. | | 345/744 |
| 2004/0267918 A1* | 12/2004 | Guarraci et al. | | 709/223 |
| 2006/0075391 A1* | 4/2006 | Esmonde et al. | | 717/136 |
| 2006/0247911 A1* | 11/2006 | Nieuwsma | | 703/27 |
| 2007/0011650 A1* | 1/2007 | Hage et al. | | 717/136 |
| 2010/0169072 A1* | 7/2010 | Zaki et al. | | 703/28 |
| 2011/0004460 A1* | 1/2011 | Duffie et al. | | 703/28 |
| 2012/0245918 A1* | 9/2012 | Overton et al. | | 703/27 |

OTHER PUBLICATIONS

Jussi Myllymaki, "Effective Web data extraction with standard XML technologies", Computer Networks 39 (2002), [retrieved on Jul. 19, 2011]. Retrieved from Internet <URL:http://www.sciencedirect.com/science/article/pii/S1389128602002141>; pp. 635-644.*

Youzhong Liu, et al., "A Gateway for Host Connectivity", IADIS International Conference WWW/Internet 2002, [retrieved on Jul. 19, 2011]. Retrieved from Internet <URL:http:/ww.iadisportal.org/digital-library>; pp. 1-10.*

Youzhong Liu, et al., "Backend Integration Gateway", IADIS International Journal on WWW/Internet 2003, [retrieved on Jul. 19, 2011]. Retrieved from Internet <URL:http:/ww.iadisportal.org/digital-library>; pp. 1-12.*

Conroy, et al., "Automatic Test Generation From GuI Applications for Testing Web Services", 2007, IEEE; [retrieved on Mar. 1, 2013]; Retrieved from Internet <URL:http://ieeexplore.ieee.org/stamp/stamp.jsp?tp=&arnumber=4362647>; pp. 345-354.*

IBM, "Transformation of a User Model into user interface test cases", 2009, IP.com; [retrieved on Mar. 1, 2013]; Retrieved from Internet <URL:http://ip.com/pdf/ipcompad/IPCOM000180307D.pdf>; pp. 1-4.*

Ivory, Hearst, The State of the ARt in Automating Usability Evaluation of User Interfaces>; 2001, ACM; [retrieved on Mar. 1, 2013]; Retrieved from Internet <URL:http://dl.acm.org/citation.cfm?id=503112>; pp. 470-516.*

Olsen, et al., "ScreenCrayons: Annotating anything"; 2004, ACM; [retrieved on Mar. 1, 2013]; Retrieved from Internet <URL:http://dl.acm.org/citation.cfm?id=1029632>; pp. 165-174.*

* cited by examiner

GENERIC XML SCREEN SCRAPING

BACKGROUND

Screen scraping is a technique in which a computer program extracts data from the display output of another computer program. Typically, a developer may write a screen scraping program for each screen to be scraped. Given the complexities associated with screen scraping, development and maintenance of a screen scraping program can be onerous. In this regard, screen scraping has become a technique that is often times implemented as a last resort. In addition to the complexities associated with this type of program, a screen scraping program may have operational limitations. For example, the screen scraping program may not be able to jump to multiple screens or read multiple pages from a screen.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Figure 1:
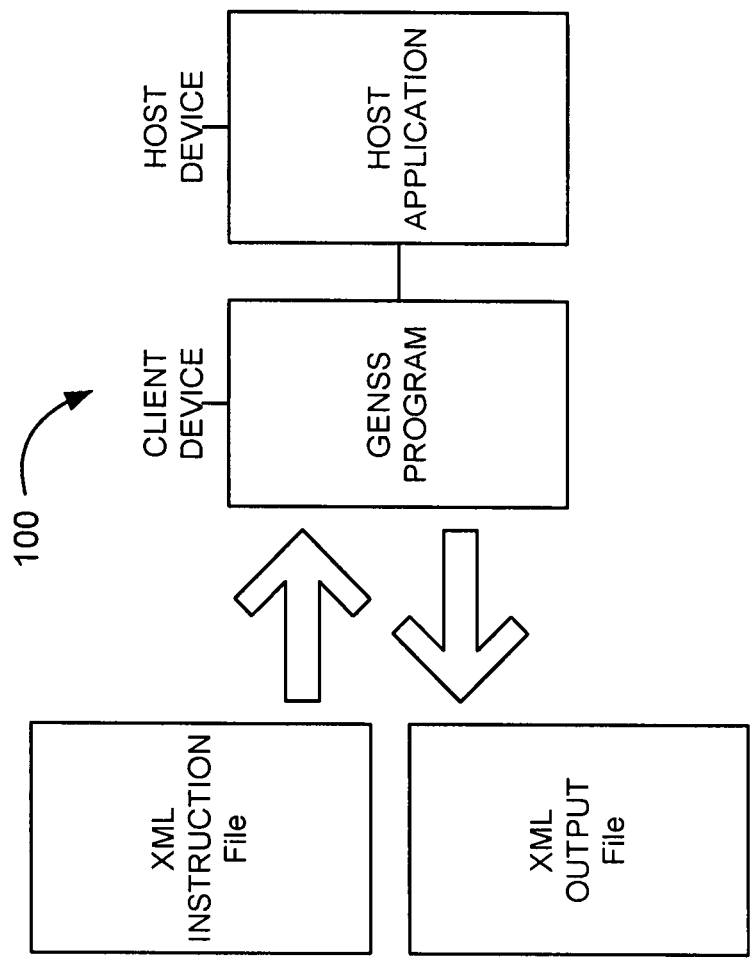
FIG. 1 is a diagram illustrating a concept described herein.

FIG. 1 is a diagram illustrating a concept described herein. As illustrated in concept 100, an Extensible Markup Language (XML) Instruction file may be created by, for example, a developer. The XML Instruction file may include instructions for operating a Generic Screen Scraping (GENSS) program that is stored on a client device (e.g., a computer). The GENSS program may read and parse the XML Instruction file and perform screen scraping operations relating to a host application within a host device (e.g., a computer) based on the parsed XML Instruction file.

The XML Instruction file may include various XML statements that include tags, text, arguments, etc., which may be interpreted by the GENSS program as a corresponding screen scraping operation. For example, an XML statement may include, among other things, a Read tag. In this instance, the GENSS program may interpret the XML Read tag as a read screen scraping operation. In another example, an XML statement may include, among other things, a conditional statement and/or a loop statement (e.g., IF, FOR, etc.). In this instance, the GENSS program may interpret the XML condition and/or the XML loop statement as a conditional or loop screen scraping operation. The GENSS program may, for example, read multiple pages of data from the screen without any additional coding, and/or read data from one screen and use that data as input to scrape another screen.

If the screen scraping operations are completed on the host device, the GENSS program may convert the extracted data and generate an Output file to the client device. In one implementation, as illustrated in FIG. 1, the Output file may be an XML Output file. In another implementation, the Output file may be a HyperText Mark-up Language (HTML) Output file or of some other format. The XML Output file may be utilized on the client device. That is, the XML Output file may provide a new and more user-friendly interface to the data and/or assets residing on the host device.

As a result of the foregoing, this new architecture for screen scraping provides a variety of enhancements compared to other methods. For example, developers may design an instruction file for screen scraping based on an XML file, which may be significantly easier to develop and maintain compared to other programs designed for screen scraping. Additionally, the GENSS program may perform sophisticated screen scraping operations based on language constructs built into the XML Instruction file. Furthermore, the GENSS program may allow developers to create new user interfaces based on extracted data and provide a more user-friendly environment to access and manage systems containing data and other assets.

Figure 2:
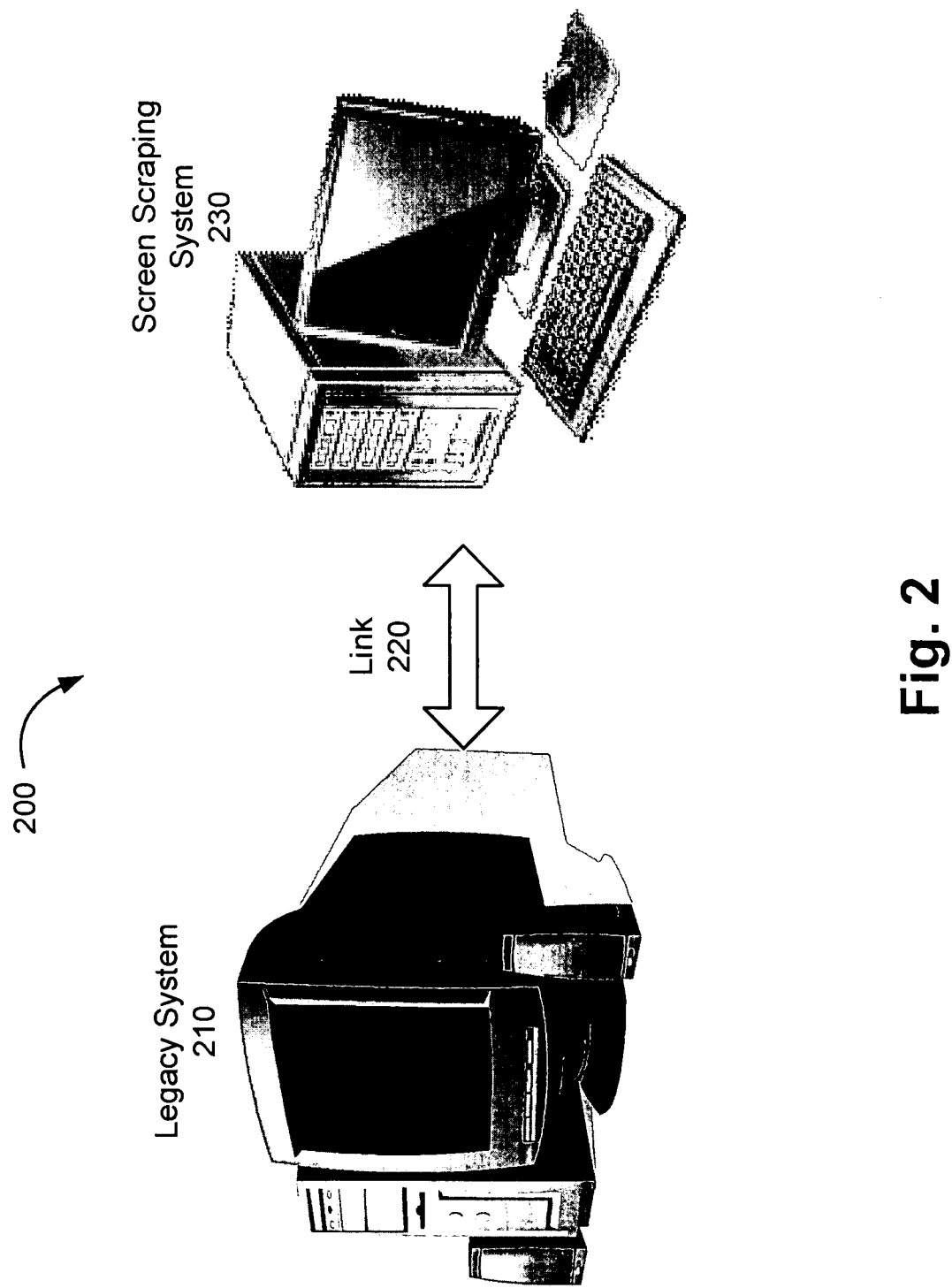
FIG. 2 is a diagram illustrating an exemplary system in which devices and methods described herein may be implemented.

FIG. 2 is a diagram illustrating an exemplary system in which devices and methods described herein may be implemented. As illustrated, system 200 may include a legacy system 210, a link 220, and a screen scraping system 230.

Legacy system 210 may include a computational device. In one implementation, legacy system 210 may include a computer or another type of computation or communication device, a thread or process running on one of these devices, and/or an object executable by one of these devices. For example, the computer may be a mainframe computer or some other host system, such as a terminal. The computer may include a legacy application. The legacy application will be described in greater below.

Link 220 may include a communication path between legacy system 210 and screen scraping system 230. For example, link 220 may be a wired or a wireless connection that connects legacy system 210 and screen scraping system 230. As will be described below, screen scraping system 230 may perform various screen scraping operations on legacy system 210 via link 220.

Screen scraping system 230 may include a computational device. In one implementation, screen scraping system 230 may include a computer or another type of computation or communication device, a thread or process running on one of these devices, and/or an object executable by one of these devices. Screen scraping system 230 may include the GENSS program. As will be described below, the GENSS program may provide for screen scraping of another system, such as legacy system 210.

Although, FIG. 2 illustrates exemplary components of system 200, in other implementations, system 200 may include fewer, additional, and/or different components than are depicted in FIG. 2. Given the widespread application of screen scraping, a variety of systems may be envisioned other than legacy systems. Today, screen scraping may be employed in relation to enterprise application integration, enterprise content management, web harvesting, unstructured data management, etc. Further, legacy system 210 is not limited to a single computer, but may include a network of interconnected computers or other configurations.

Figure 3:
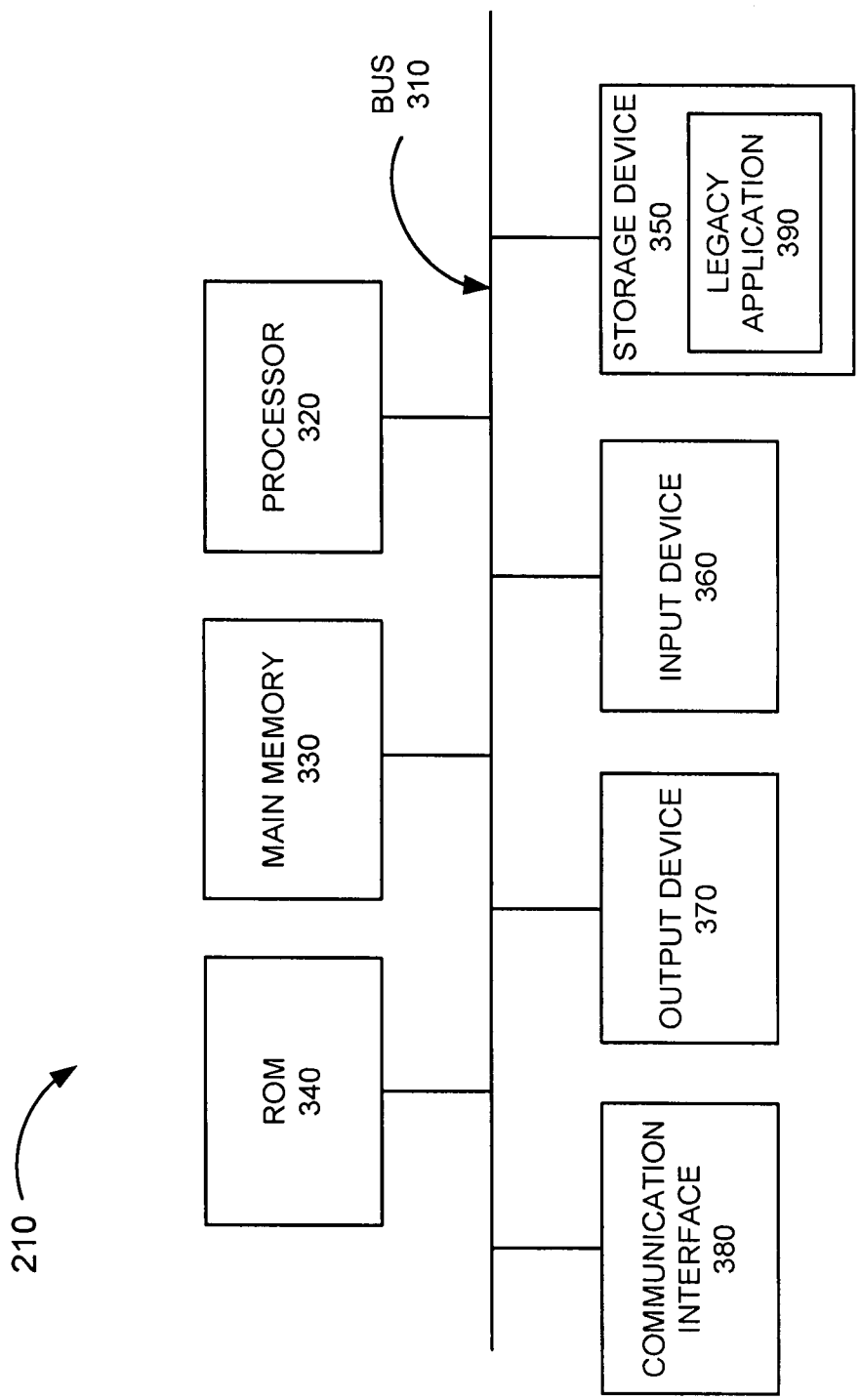
FIG. 3 is a diagram illustrating exemplary internal components of a device that may correspond to the legacy system depicted in FIG. 2.

FIG. 3 is a diagram illustrating exemplary internal components of a device that may correspond to the legacy system depicted in FIG. 2. As illustrated, legacy system 210 may include a bus 310, a processor 320, a main memory 330, a read only memory (ROM) 340, a storage device 350, an input device 360, an output device 370, and a communication interface 380.

Bus 310 may include a path that permits communication among the exemplary components of the device. Processor 320 may include a processor, a microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for execution by processor 320. Storage device 350 may include, for example, a magnetic and/or an optical recording medium and its corresponding drive.

Input device 360 may include a mechanism that permits an operator to input information to the device, such as a keyboard, a button, a mouse, etc. Output device 370 may include a mechanism that outputs information to the operator, including a display, one or more light emitting diodes (LEDs), a printer, a speaker, etc. Communication interface 380 may include any transceiver-like mechanism that enables the device to communicate with other devices and/or systems.

As further shown in FIG. 3, storage device 350 may include a legacy application 390. Legacy application 390 may include software relating to managing and accessing a repository of data. For example, legacy application 390 may relate to an application for bulk data processing information, such as financial transaction records or service orders. In some instances, legacy application 390 may be based on a low level programming language and/or may provide a non-graphical user interface.

The device depicted in FIG. 3 may perform certain operations relating to legacy application 390. Legacy system 210 may perform these operations in response to processor 320 executing software instructions contained in a computer-readable medium, such as main memory 330. A computer-readable medium may be defined as a physical or logical memory device and/or carrier wave. The software instructions may be read into main memory 330 from another computer-readable medium, such as storage device 350. The software instructions contained in main memory 330 may cause processor 320 to perform processes associated with legacy application 390. Alternatively, hardwired circuitry may be used in place of or in combination with software instructions to implement processes described herein. Thus, implementations described herein are not limited to any specific combination of hardware circuitry and software.

Although FIG. 3 shows exemplary components of legacy system 210, in other implementations, legacy system 210 may contain fewer, different, or additional components than depicted in FIG. 3. In still other implementations, one or more components of legacy system 210 may perform some or all of the tasks described as being performed by one or more other components of legacy system 210.

Figure 4:
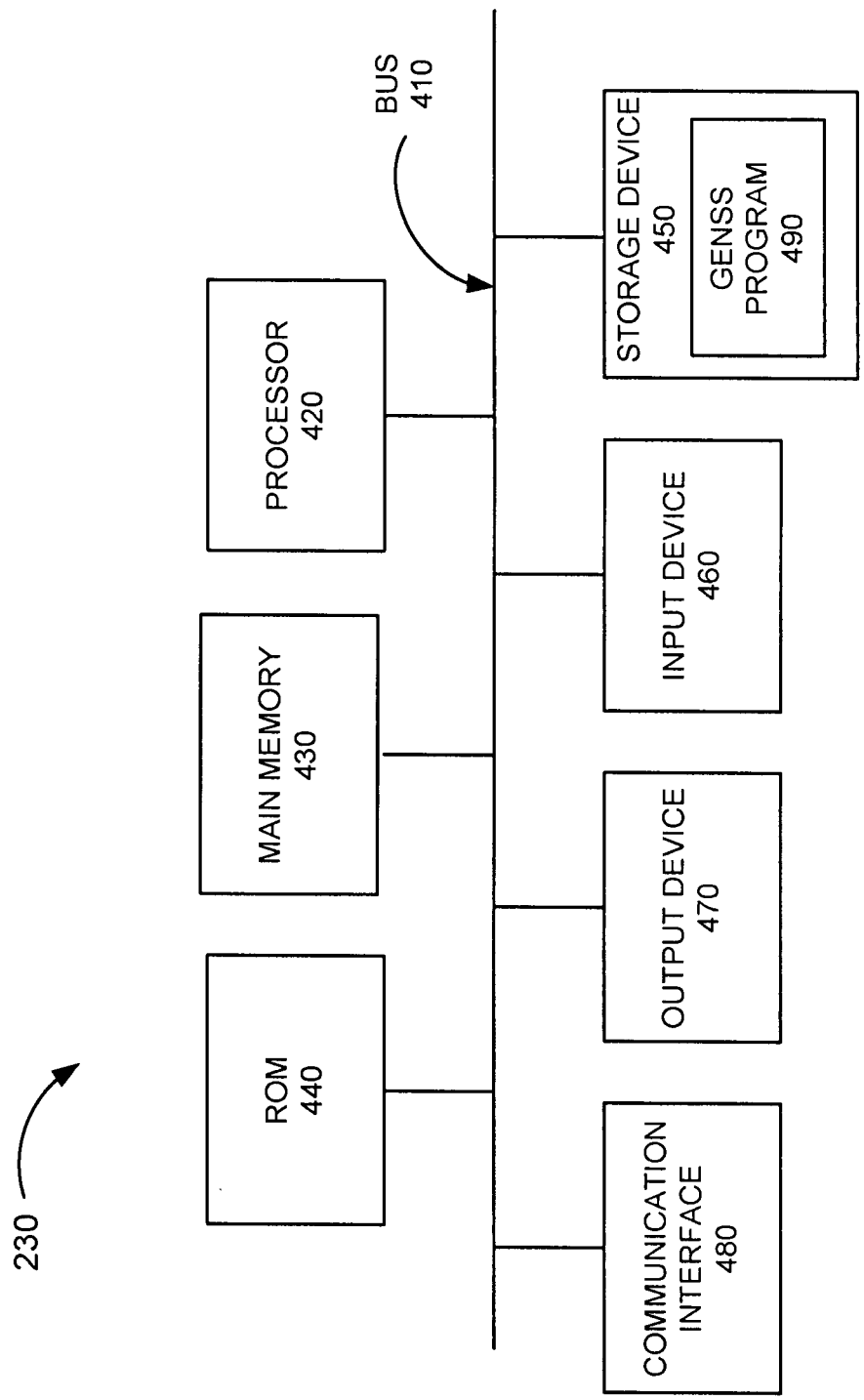
FIG. 4 is a diagram illustrating exemplary internal components of a device that may correspond to the screen scraping system depicted in FIG. 2.

FIG. 4 is a diagram illustrating exemplary internal components of a device that may correspond to the screen scraping system depicted in FIG. 2. As illustrated, screen scraping system 230 may include a bus 410, a processor 420, a main memory 430, a read only memory (ROM) 440, a storage device 450, an input device 460, an output device 470, and a communication interface 480.

Bus 410 may include a path that permits communication among the exemplary components of the device. Processor 420 may include a processor, a microprocessor, or processing logic that may interpret and execute instructions. Main memory 430 may include a random access memory (RAM) or another type of dynamic storage device that may store information and instructions for execution by processor 420. ROM 440 may include a ROM device or another type of static storage device that may store static information and instructions for execution by processor 420. Storage device 450 may include a magnetic and/or an optical recording medium and its corresponding drive.

Input device 460 may include a mechanism that permits an operator to input information to the device, such as a keyboard, a button, a mouse, a pen, a microphone, voice recognition and/or biometric mechanisms, etc. Output device 470 may include a mechanism that outputs information to the operator, including a display, one or more light emitting diodes (LEDs), a printer, a speaker, etc. Communication interface 480 may include any transceiver-like mechanism that enables the device to communicate with other devices and/or systems.

As further shown in FIG. 4, storage device 450 may include a GENSS program 490. As will be described in greater detail below, GENSS program 490 may include software that provides screen scraping capability based on an XML Instruction file.

The device depicted in FIG. 4 may perform certain operations relating to screen scraping. The device may perform these operations in response to processor 420 executing software instructions contained in a computer-readable medium, such as main memory 430. A computer-readable medium may be defined as a physical or logical memory device and/or carrier wave. The software instructions may be read into main memory 430 from another computer-readable medium, such as storage device 450. The software instructions contained in main memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of screen scraping system 230, in other implementations, screen scraping system 230 may contain fewer, different, or additional components than depicted in FIG. 4. In still other implementations, one or more components of screen scraping system 230 may perform some or all of the tasks described as being performed by one or more other components of screen scraping system 230.

Figure 5:
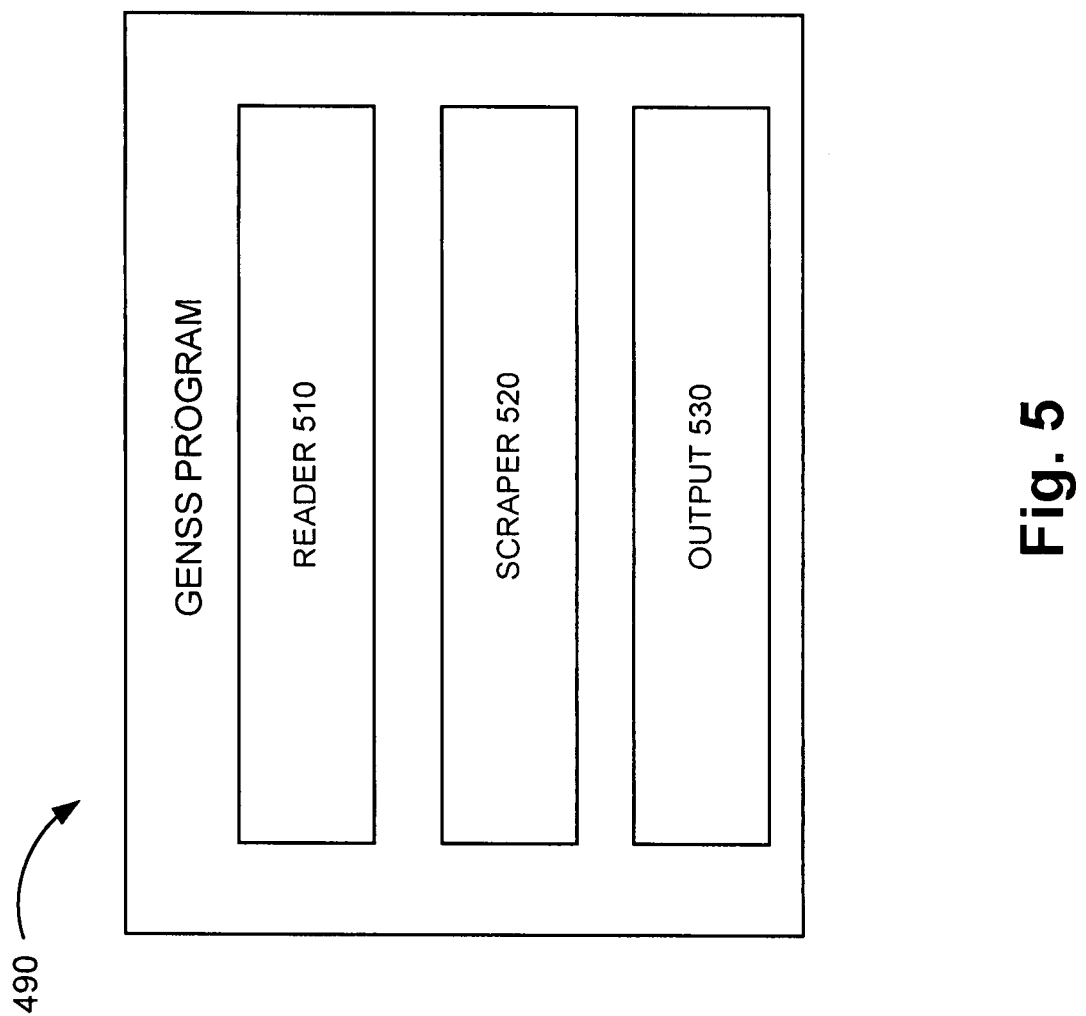
FIG. 5 is a diagram illustrating exemplary functional components of the GENSS program depicted in FIG. 4.

FIG. 5 is a diagram illustrating exemplary functional components of the GENSS program depicted in FIG. 4. As illustrated, GENSS program 490 may include a reader module 510, a scraper module 520, and an output module 530. GENSS program 490 may support both Document Type Definitions (DTD) and XML Schema based XML documents. GENSS program 490 may be based on Java and/or may be employed with a wide variety of different platforms.

It will be appreciated that GENSS program 490 may include other modules (not illustrated) that aid in screen scraping a system, such as legacy system 210. For example, GENSS program 490 may include a host integration interface, such as a standard or enhanced Terminal Emulation Application Programming Interface (API) interface, or some other type of suitable host interface.

Reader module 510 may include an XML reader, such as a Java XML reader. Reader module 510 may read XML instructions from an XML file, such as the XML Instruction file. Reader module 510 may also include an XML parser, such as a Java XML parser. For example, the XML parser may be a Java API for XML Processing (JAXP). In other instances, the XML parser may be a Document Object Model (DOM) parser or a Simple API for XML (SAX) parser. The XML parser may parse the XML from the XML Instruction file. For example, reader module 510 may parse the XML into XML document objects.

Scraper module 520 may provide screen scraping operations for a system, such as legacy system 210. In one implementation, scraper module 520 may perform various screen scraping operations based on the parsed XML document objects. For example, scraper module 520 may interpret the parsed XML document objects as instructions that correspond to screen scraping. For example, scraper module 520 may perform reads and writes, as well as more sophisticated operations normally associated with programming languages, such as control flow statements and conditional statements. For example, scraper module 520 may perform screen scraping operations based on XML IF statements, XML WHILE loop statements, XML DO-WHILE loop statements, XML FOR loop statements, and/or XML SWITCH block statements.

Scraper module 520 may also send emulated keystrokes to move from one screen to another screen on legacy system 210 and/or to write to legacy system 210. In one implementation, the emulated keystrokes may be based on KeyDown keystrokes and KeyPress keystrokes. For example, a KeyDown keystroke may include an ENTER keystroke or programmed function keystrokes, such as F1 through F12 keystrokes, to move from one screen to another screen. A KeyPress keystroke may include a character data keystroke, such as a keystroke associated with a standard alphanumeric character on a keyboard. A KeyPress keystroke may be associated with a writing operation.

Additionally, scraper module 520 may perform various verifications during screen scraping. For example, scraper module 520 may perform value comparisons between a value (e.g., a character string) contained in the XML Instruction file and a value (e.g., a character string) output from legacy system 210. In this way, scraper module 520 may verify that various screen scraping operations between scraper module 520 and legacy system 210 correspond to, for example, a sequence in the XML Instruction file. An example of a verification command is provided below.

As previously mentioned, scraper module 520 may perform various screen scraping operations, such as read, write, and control flow statements, based on XML instructions contained in the XML Instruction file. An XML Instruction may include, for example, start and end tags, and elements. In one implementation, the elements may include arguments corresponding to a screen scraping operation. For example, scraper module 520 may perform read and write operations based on arguments, such as column and row positions and/or length indicators. The column and row positions may identify a display location corresponding to the screen of legacy system 210. Scraper module 520 may read and/or write information according to the display location.

In one example, an XML statement may include, among other things, the arguments of column=2 and row=5. In this instance, scraper module 520 may perform a display matrix calculation based on these arguments to position itself to read and/or write from this display location. In addition, the XML statement may include an argument, such as length=5. Scraper module 520 may read and/or write for a length of five (5), starting from the display location corresponding to the column and row arguments. In this regard, an XML statement may include various arguments and/or other information that may be interpreted by scraper module 520 to perform the corresponding screen scraping operation. Furthermore, extracted data during run time may be utilized by scraper module 520 to perform various screen scraping operations.

In view of the above, scraper module 520 may perform various screen scraping operations. Scraper module 520 may scrape a single screen, multiple screens and/or linked screens based on the XML Instruction file. In addition, scraper module 520 may utilize data extracted from one screen to access one or more other screens. Despite the screen scraping operations specifically mentioned, it is to be understood, although not specifically described, that additional screen scraping operations may be performed.

Output module 530 may perform various processes to generate an Output file. For example, when scraper module 520 completes the instructions contained in the XML Instruction file, output module 530 may convert the extracted data from legacy application 390 to form an Output file. Output module 530 may convert the extracted data into any number of formats, such as XML, HTML, etc. The Output file may provide a user interface to the data and assets residing on legacy system 210. That is, a user of screen scraping system 230 may utilize, for example, an XML Output file when accessing, managing, etc., the data associated with legacy application 390.

Although FIG. 5 illustrates exemplary functional components within GENSS program 490, in other implementations, fewer, additional, and/or different functional components than those depicted in FIG. 5 may be employed. In still other implementations, one or more functional components may be operable within one or more different modules described above.

Figure 6:
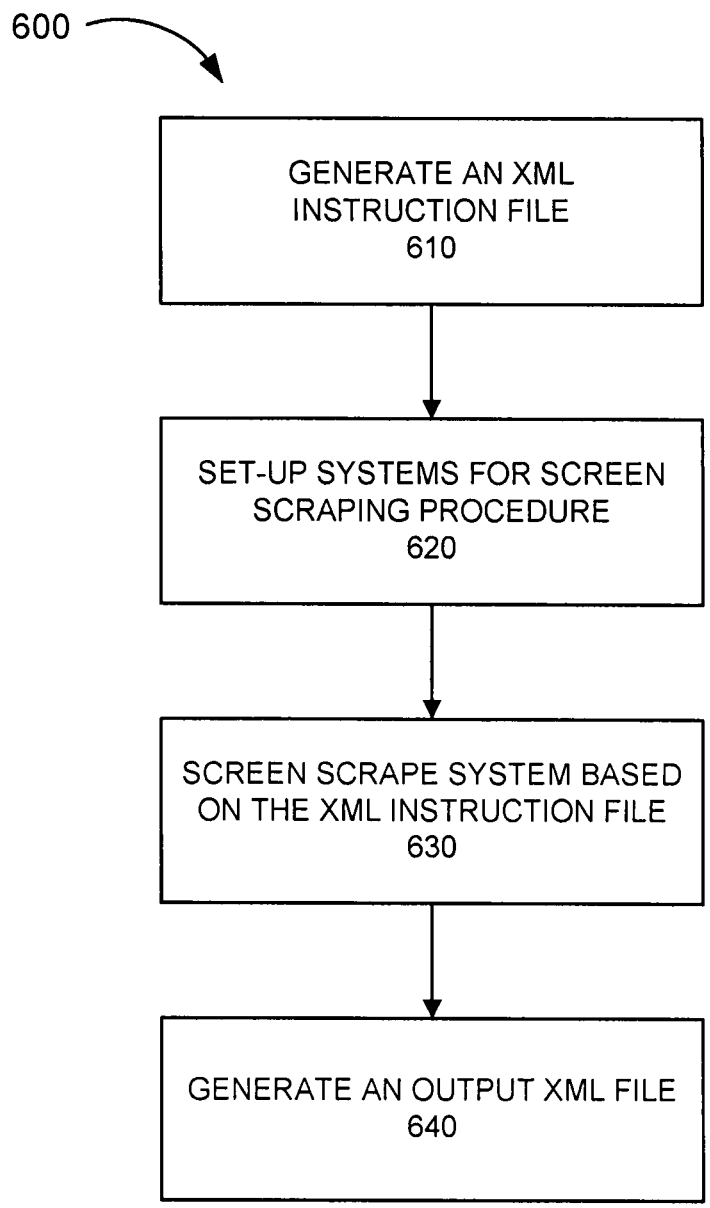
FIG. 6 is a flow chart of an exemplary process for screen scraping.

FIG. 6 is a flow chart of an exemplary process for screen scraping. In one implementation, process 600 may be performed by screen scraping system 230 (e.g., via GENSS program 490). As illustrated, process 600 may begin with creation of an XML Instruction file (Block 610). For example, a developer may create the XML Instruction file (e.g., a template XML Instruction file) based on the screen shots of a host application to be scraped. In one implementation, a developer may run the host application to be scraped to identify the screens to be scraped and the content contained therein. The developer may write XML Instructions to screen scrape the display output of the host application based on this procedure.

In Block 620, the systems may be set-up for a screen scraping procedure. For example, a client device may include GENSS program 490. The XML Instruction file may be loaded onto the client device (e.g., screen scraping system 230), and/or may be stored in storage device 350. The client device may be connected (e.g., via link 220) to a host device (e.g., legacy system 210). The connection may be, for example, wired or wireless, and/or via a network. The host device that includes the host application may run the host application to be scraped.

Depending on the systems involved, various host interfaces may be employed that include one or more communication and emulation protocols. For example, a standard Terminal Emulation API interface, such as IBM Standard 32-bit High-Level Language Application Programming Interface (HLLAPI), may be employed. Alternatively, an enhanced Terminal Emulation API interface, such as an Extended (EHLLAPI), may be employed. A client/host screen scraping session may be established and a client/host dialog may be executed, as described herein.

In Block 630, the system may be screen scraped based on the XML Instruction file. For example, in one implementation, GENSS program 490 may perform various screen scraping operations based on the XML Instruction file, as described herein, on a host device (e.g., legacy system 210). In addition to read and write screen scraping operations, GENSS program 490 may perform more sophisticated operations, such as reading from one screen and utilizing that data as input to scrape another screen. During run time, the XML Instruction file may, for example, extract data from the host device (e.g., legacy system 210) in an interactive manner. Thus, the XML Instruction file may not be a static file. That is, for example, extracted data during run time may be written into the XML Instruction file, which, in turn may be read to perform a subsequent screen scraping operation, etc.

In Block 640, an XML Output file may be generated. For example, in one implementation, GENSS program 490 may generate the XML Output file based on the extracted data from the screen scraping operations. GENSS program 490 may convert the extracted data to form a corresponding XML Output file. The XML Output file may operate on the client device, such as screen scraping system 230.

Although FIG. 6 illustrates exemplary operations for screen scraping, in other implementations, fewer, additional, or different operations may be performed. For example, in Block 640, the Output file may be of a different format, such as an HTML Output file or some other suitable format.

Figure 7:
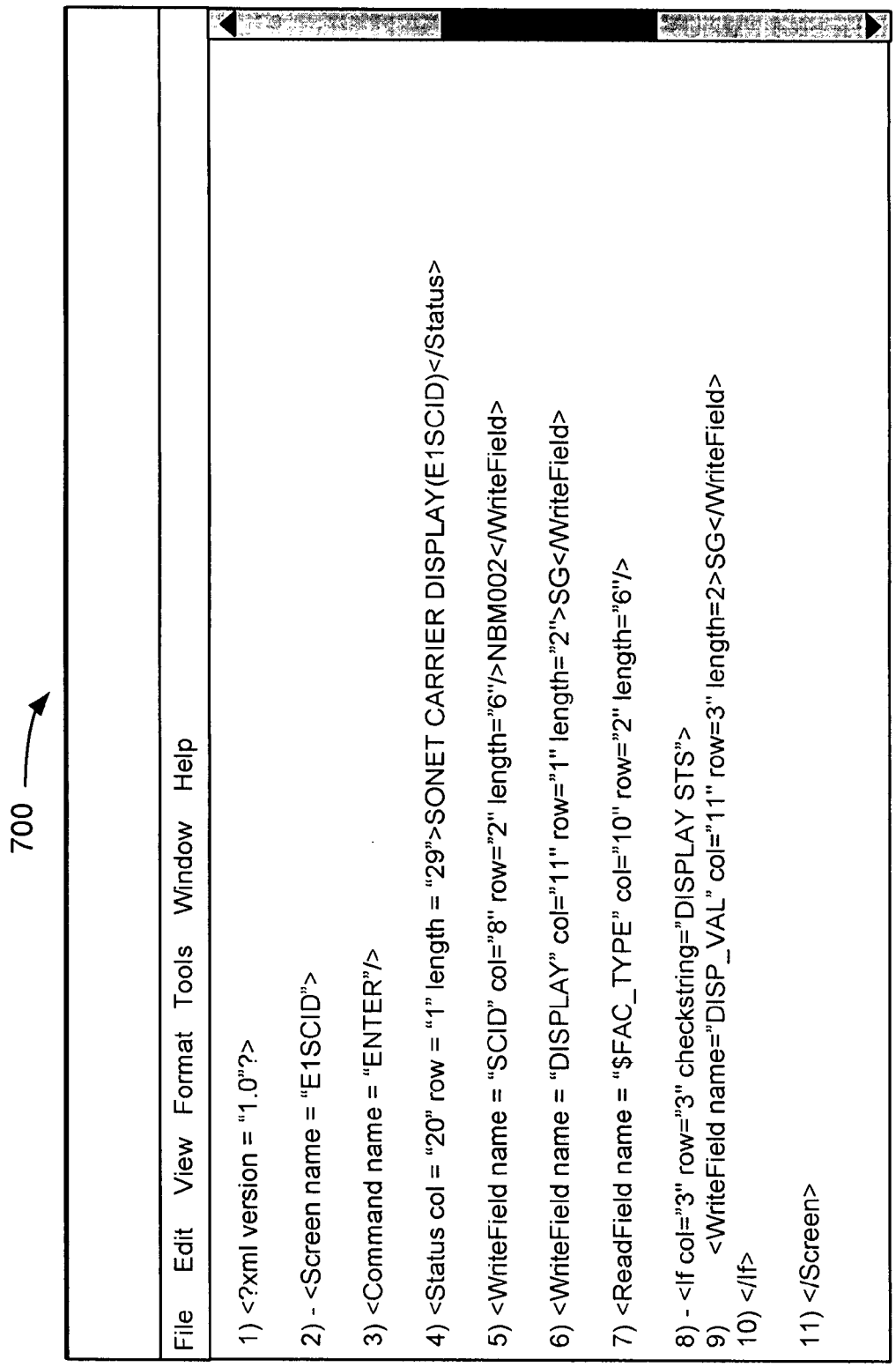
FIG. 7 is a diagram illustrating an exemplary XML Instruction file.

FIG. 7 is a diagram illustrating an exemplary XML Instruction file. For purposes of discussion only, a line number is indicated beside each XML instruction with XML Instruction file 700. Additionally, the screen scraping operations described in relation to each XML Instruction are presented in a manner that omits various processes, such as parsing, etc.

In line 1, an XML declaration of the version of XML may be stated. Line 2 may begin with a start tag (i.e., Screen) followed by an element (i.e., name="E1SCID") that provides a reference for GENSS program 490 to the screen that is to be scraped. In line 3, GENSS program 490 may input an ENTER command into legacy system 210. In line 4, the Status command may verify that the previous command (i.e., the ENTER command) was correct. In this example, GENSS program 490 may position itself at column 20, row 1, for a value comparison. The value comparison may occur between the output string at column 20, row 1 of legacy application 390 and the string contained in the XML Instruction file stated in line 4, which is SONET CARRIER DISPLAY (E1SCID). Also in line 4, a length indicator, length 29, may correspond to the length of the string, including spaces. If the values corresponding to the strings match, then GENSS program 490 may know that the ENTER command was the correct command. If the values do not match, then GENSS program 490 may know that the ENTER command was not the correct command.

In line 5, a write command (WriteField) may be called, and a reference string, name=SCID, may be indicated. The reference string may provide a reference for the developer. Further, in line 5, the XML statement may include column, row, and/or length arguments. The column and length arguments may position GENSS program 490 to write the string NBM002. The length argument may provide GENSS program 490 with a number of characters to be written. In one example, the string NBM002, may be provided during run time. Similarly, line 6 may provide another write command. A reference string, name=DISPLAY, may be indicated, and may be proceeded by column, row and length arguments. GENSS program 490 may write the string SG beginning at the indicated position.

In line 7, a read command (ReadField) may be called. A reference string, name=$FAC_TYPE, may be indicated, and may be proceeded by column, row and length arguments. The arguments may position GENSS program 490 to read from legacy application 390 at the indicated position. In lines 8 through 10, GENSS program 490 may execute an IF statement. In this example, GENSS program 490 may position itself at column 3, row 3, and may check whether legacy application 390 outputs a value corresponding to the string DISPLAY STS. If so, in line 9, GENSS program 490 may write SG at a location corresponding to column 11, row 3, with length 2. In line 11, the end tag Screen may be indicated.

Although FIG. 7 illustrates an exemplary XML Instruction file, in other implementations, the XML Instruction file may include fewer, different, or additional types of XML instructions and/or tags, elements, etc.

The foregoing description of implementations provides illustration, but is not intended to be exhaustive or to limit the implementations to the precise form disclosed. Modifications and variations are possible in light of the above teachings or may be acquired from practice of the teachings. The foregoing description, however, provides a new architecture to improve the performance of screen scraping, while reducing development and maintenance time.

In addition, while a series of blocks has been described with regard to a process illustrated in FIG. 6, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A computer-implemented method comprising:
    creating, by a processor associated with the computer, an initial Extensible Markup Language (XML) instruction file,
        the initial XML instruction file identifying one or more screen images of a plurality of screen images provided by a host system;
    executing, by the processor, screen scraping operations based on the initial XML instruction file,
        executing the screen scraping operations including:
            receiving a first screen image provided by the host system, determining that the first screen image, provided by the host system, is included in the one or more screen images identified in the initial XML instruction file, reading first data from the first screen image, provided by the host system, based on determining that the first screen image is included in the one or more screen images identified in the initial XML instruction file, updating, based on the first data acquired from reading the first screen image, the initial XML instruction file to form an updated XML instruction file that identifies a second screen image of the plurality of screen images provided by the host system, the initial XML instruction file not identifying the second screen image, and reading, based on the updated XML instruction file, second data from the second screen image provided by the host system; and generating, by the processor and based on the first data and the second data from executing the screen scraping operations, a user interface file, the user interface file being in an format that is compatible with a user device, and the user interface file enabling the user device to access to the host system.

2. The method of claim 1, where the computer is a client device that differs from the host system.

3. The method of claim 1, where executing the screen scraping operations comprises:

parsing the initial XML instruction file into XML document objects corresponding to the one or more screen images provided by the host system.

4. The method of claim 1, where creating the initial XML instruction file includes:

forming XML tags corresponding to the one or more screen images provided by the host system, and where executing the screen scraping operations comprises:

utilizing the XML tags to perform the screen scraping operations related to the first screen image.

5. The method of claim 1, where executing the screen scraping operations comprises:

executing screen scraping operations corresponding to at least one of XML conditional statements included in the XML instruction file and XML loop statements included in the XML instruction file.

6. The method of claim 1, where executing the screen scraping operations comprises:

executing the screen scraping operations based on at least one of an IF statement, a WHILE loop, a DO-WHILE loop, a FOR loop, or a SWITCH statement included in the XML instruction file.

7. The method of claim 1, where the user interface includes an XML output file that is executed by the user device to emulate the host system.

8. A non-transitory memory device storing instructions, the instructions comprising:

one or more instructions which, when executed by at least one processor, cause the at least one processor to establish a connection with a host device;

one or more instructions which, when executed by the at least one processor, cause the at least one processor to access an Extensible Markup Language (XML) instruction file associated with the host device, the XML instruction file identifying one or more screen images provided by the host device;

one or more instructions which, when executed by the at least one processor, cause the at least one processor to obtain, based on the XML instruction file, first data associated with a first screen image provided by the host device, the one or more instructions to obtain the first data including:

one or more instructions to determine that the first screen image is included in the one or more screen images identified in the XML instruction file, and one or more instructions to read first data from the first screen image based on determining in the first screen image is included the one or more screen images identified in the XML instruction file;

one or more instructions which, when executed by the at least one processor, cause the at least one processor to convert the first data read to an XML format;

one or more instructions which, when executed by the at least one processor, cause the at least one processor to write the converted first data to the XML instruction file to form an updated XML instruction file, the updated XML instruction file identifying a second screen image provided by the host device, and the second screen image not being included in the one or more screen images identified in the XML instruction file prior to the XML instruction file being updated; and one or more instructions which, when executed by the at least one processor, cause the at least one processor obtain, based on the second screen image being identified in the updated XML instruction file, second data from the second screen image.

9. The memory device of claim 8, further comprising:

one or more instructions to provide, based on at least one of the first data or the second data, a user interface to access a host application of the host device.

10. The memory device of claim 8, where the one or more instructions to obtain the first data further comprise:

one or more instructions to parse the XML instruction file; and one or more instructions to obtain the first data based on parsing the XML instruction file.

11. The memory device of claim 8, where the one or more instructions to obtain the first data further comprise:

one or more instructions to interpret XML tags included in the XML instruction file; and one or more instructions to obtain the first data based on instructing the XML tags.

12. The memory device of claim 8, where the one or more instructions to obtain the first data further comprise:

one or more instructions to interpret at least one of:

an XML IF statement associated with the XML instruction file, an XML WHILE loop statement associated with the XML instruction file, an XML DO-WHILE loop statement associated with the XML instruction file, an XML FOR loop associated with the XML instruction file, or an XML SWITCH statement associated with the XML instruction file; and one or more instructions to perform a screen scraping operation associated with the first screen image based on interpreting the at least one of the XML IF statement, the XML WHILE loop statement, the XML DO-WHILE loop statement, the XML FOR loop, or the XML SWITCH statement.

13. The memory device of claim 8, where the one or more instructions to obtain the first data further comprise:
one or more instructions to obtain the first data based on at least one of conditional statements contained in the XML instruction file or loop statements contained in the XML instruction file.

14. The memory device of claim 8, where the one or more instructions to obtain the first data comprise:
one or more instructions to verify that the first data is accurate based on an XML tag contained in the XML instruction file.

15. The memory device of claim 8, where the one or more instructions to obtain the first data comprise:
one or more instructions to read from the host device and write to the host device based on, respectively, an XML read tag associated with the XML instruction file and an XML write tag associated with the XML instruction file.

16. The memory device of claim 9, where the instructions further comprise:
one or more instructions to generate, based on the first data and the second data, an XML file associated with the user interface to access the host device.

17. A device comprising:
a memory to store instructions; and
a processor to execute one or more of the instructions to:
establish a session with a host device;
receive, via the session, a plurality of screen images from the host device,
the plurality of screen images including a first screen image and a second screen image;
interpret an Extensible Markup Language (XML) instruction file associated with the host device,
the XML instruction file identifying the first screen image and not identifying the second screen image;
read, based on interpreting the XML instruction file that identifies the first screen image, first data from the first screen image provided by the host device;
update, based on the first data, the XML instruction file to identify the second screen image;
read, based on the updating the XML instruction file to identify the second screen image, second data from the second screen image provided by the host device; and
generate, based on the second data, an output file that is executed to provide a user interface to access the host device.

18. The device of claim 17, where the processor, when reading the first data from the first screen image provided by the host device, further executes one or more of the instructions to:
emulate a keystroke, associated with the screen image, based on an XML command tag included in the XML instruction file.

19. The device of claim 17, where the processor further executes one or more of the instructions to:
execute a debugging procedure of the output file based on an XML status tag associated with the XML instruction file.

20. The device of claim 17, where the processor, when reading the first data from the first screen image provided by the host device, further executes one or more of the instructions to:
execute a read operation and a write operation based on, respectively, an XML read tag included in the XML instruction file and an XML write tag included in the XML instruction file.

21. The device of claim 17, where the processor, when reading the second data from the second screen image, further executes one or more of the instructions to:
execute at least one of a loop or a condition based on, respectively, an XML loop tag included in the XML instruction file or an XML conditional tag included in the XML instruction file.

22. The device of claim 17, where the processor, when generating the output file, further executes one or more of the instructions to:
convert the second data to an XML format; and
assemble the converted second data to form an XML output file.

23. A system, comprising:
a processor to:
execute a screen scraping operation, of a host device, based on an Extensible Markup Language (XML) instruction file provided,
the processor, when executing the screen scraping operation, being to:
read data from a screen image, provided by the host device, based on the screen image being identified in the XML instruction file,
the data, read from the screen image, including information associated with another screen image provided by the host device, and
the XML instruction file not identifying the other screen image,
update, based on the data read from the screen image, the XML instruction file to identify the other screen image, and
read, based on updating the XML instruction file to identify the other screen image, additional data from the other screen image provided by the host device; and
generate a user interface file based on the data and the addition data,
the user interface file being executed to emulate one or more functions associated with the host device.

24. The system of claim 23, where, when the processor is executing the screen scraping, the processor further is to:
interpret XML tags, associated with the XML instruction file, to perform a corresponding screen scrape operation associated with at least one of:
reading the data from the screen image, or
reading the additional data from the other screen image.

* * * * *